United States Patent
Ito et al.

(10) Patent No.: US 6,558,807 B2
(45) Date of Patent: May 6, 2003

(54) OXIDE MAGNETIC MATERIAL, COIL COMPONENTS USING THE SAME, AND METHOD FOR PRODUCING OXIDE MAGNETIC MATERIALS AND COIL COMPONENTS

(75) Inventors: Ko Ito, Tokyo (JP); Yukio Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/764,089

(22) Filed: Jan. 19, 2001

(65) Prior Publication Data

US 2001/0022354 A1 Sep. 20, 2001

(30) Foreign Application Priority Data

Jan. 21, 2000 (JP) ......................................... 2000-012363

(51) Int. Cl.⁷ ............................. B32B 15/02; H01F 1/00; H01F 35/26
(52) U.S. Cl. .................... 428/472; 428/469; 252/62.57; 252/62.59; 252/62.62; 241/16
(58) Field of Search ............................. 252/62.57, 62.59, 252/62.62; 241/16; 428/472

(56) References Cited

U.S. PATENT DOCUMENTS

| | | | | |
|---|---|---|---|---|
| 4,490,268 A | * | 12/1984 | Tchernev | 252/62.56 |
| 5,065,946 A | * | 11/1991 | Nishida et al. | 241/16 |
| 6,287,479 B1 | * | 9/2001 | Tanaka | 252/62.59 |
| 6,296,791 B1 | * | 10/2001 | Kobayashi et al. | 252/62.56 |

FOREIGN PATENT DOCUMENTS

| JP | 6-80613 | 10/1994 |
|---|---|---|
| JP | 2599887 | 1/1997 |
| JP | 2708160 | 10/1997 |

OTHER PUBLICATIONS

Saburo Hori, "Tough Zirconia—Tough Ceramics", issued by Kabushiki Kaisha Uchida Rhokakuho, pp. 58–70, Nov. 30, 1990.

* cited by examiner

Primary Examiner—Deborah Jones
Assistant Examiner—G. Blackwell-Rudasill
(74) Attorney, Agent, or Firm—Oblon, Spivak, McClelland, Maier & Neustadt, P.C.

(57) ABSTRACT

To use a media agitating mill of a wet internal circulation type when grinding materials, and offer oxide magnetic materials and coils in which influences of $ZrO_2$ and $Y_2O_3$ mixing when using partially stabilized zirconia as media beads are improved. The magnetic materials and coils are characterized in that $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same.

9 Claims, 1 Drawing Sheet

OXIDE MAGNETIC MATERIAL, COIL COMPONENTS USING THE SAME, AND METHOD FOR PRODUCING OXIDE MAGNETIC MATERIALS AND COIL COMPONENTS

BACKGROUND OF THE INVENTION

The present invention relates to oxide magnetic materials to be used in fields of high frequency and a method of producing the same, as well as coil components of bulk type using the oxide magnetic material, laminated coil components including internal conductors and a method of producing the same.

As oxide magnetic materials such as coil component to be used in fields of high frequency, Ni—Cu—Zn based ferrite is in general employed, and a producing method therefor is ordinarily a powder metallurgy method.

This method weighs oxides such as $Fe_2O_3$, NiO, CuO or ZnO to be predetermined percentages, wet- or dry-mixes and grinds, and pre-sinters the mixed and ground powders. Subsequently, the pre-sintered material is roughly ground and further finely ground. In a case of the wet-grind, the drying process is necessary.

The characteristics of ferrite much depend on the composition thereof, and from the viewpoint of production management, a composition of a final product should be deviated as little as possible from a target composition.

It is necessary that a material for a laminated coil be sintered at lower temperatures than a melting point of Ag, and in a final product, such a management of the composition is demanded at a level of 0.1 mol % of $Fe_2O_3$, NiO, CuO and ZnO. In particular, as to $Fe_2O_3$, coming nearer to a stoichiometric composition of ferrite, its reactivity goes up, but exceeding said level, the reactivity rapidly goes down, and accordingly, the most careful management of the composition is required among main components of ferrite.

Incidentally, for a conventional Ni—Cu—Zn ferrite, a stainless steel ball, alumina ball or zirconia ball were used as media beads in its manufacturing process, and materials having passed through mixture, grind, and pre-sintering were subjected to a rough and a fine grind. In the material for bulk typed coil, the pre-sintered material is ordinarily ground such that a specific surface area is 1.0 to 7.0 m$^2$/g, and as the laminated typed material is necessarily sintered at lower temperature than a melting point of Ag, a long time is taken for grind, and the specific surface area is heightened to around 3.0 to 15.0 m$^2$/g, thereby to improve the reactivity of the ground powders at low temperature.

In the stainless steel ball, Fe is a main component, and a part of $Fe_2O_3$ being a main component in the composition of Ni—Cu—Zn ferrite is increased by a mechanochemical reaction when grind. This increase of $Fe_2O_3$ changes the composition of Ni—Cu—Zn ferrite, and makes a management of stable composition difficult to an extent that the management is not available by weighed values. A difficulty was involved with the abrasion resistance also in other media beads and a problem was that abrasion powders of these beads might be mixed as impurities.

In the general media beads, an inside toughness, that is, the abrasion resistance is low in comparison with an outside toughness, and a deviation in the composition arises due to difference in a mixing amount during continuing productions, so that a stable composition might not be probably obtained, and the grind efficiency is low. In addition, a grind for a long time invites an increase of the mixing amount and deterioration of characteristics of sintered materials, accordingly. Abrasion powders mixed as impurities worsens the sintering property of Ni—Cu—Zn ferrite, and sintering temperature becomes high for obtaining a density and a permeability of sintered body in the vicinity of a theoretical density, resulting in a production cost-up and decrease of stability of products, and the sintering below the Ag melting point is difficult.

Japanese Patent No. 2708160 sets forth that, aiming at decreasing mixture of abrasion powders during grind, balls composed of fully stabilized zirconia (called as "FSZ" hereafter) of large abrasion resistance or partially stabilized zirconia (called as "PSZ" hereafter) are used as media beads for grinding Mn—Zn based ferrite.

The method disclosed in Japanese Patent No. 2708160 is to use the zirconia balls of 0.5 to 3.0 mm as the media beads in the fine grind process, thereby preventing inclusion of impurities to the most to be below 0.02 wt % vs. the main components. Further, by this method, if the sintering is carried out at lower temperature by around 100 to 200° C. with respect to the conventional pre-sintering temperature of 1200° C. or higher, a sintered body of the high density near the theoretical density is obtained, so that the sintering temperature decreases industrially and the production cost can be reduced.

Japanese Patent No. 2599887 shows an example that, for a purpose of offering a magnetic material of high mechanical strength, $ZrO_2$ of 0.01 to 3.0 wt % is mixed for main components of materials of Ni—Cu—Zn ferrite, and is sintered for 1.5 hours.

Postexamined Japanese patent publication JP-B-6-80613 discloses an example that, for a purpose of offering a Ni—Zn ferrite of a high density, $Bi_2O_3$ is added in a range of 4<$Bi_2O3$≦20 wt % with respect to main components of Ni—Zn based ferrite to obtain a magnetic material of a high density.

But the sintering temperature in the range of 1000° C. described in Japanese Patent No. 2708160 is high and it is not a temperature enabling to realize reduction of the sintering cost. Additionally, when Ag is used as a conductor, a simultaneous sintering with Ag of the melting point being around 960° C. is impossible. Being 1100° C. as in JP-A-7-133150, it is still more impossible to simultaneously sinter with Ag.

In the method described in the above mentioned Japanese Patent No. 2708160, the media beads of small diameter are used for controlling inclusion of impurities by abrasion of the media beads to be low, and a pre-sintered material is ground taking a long time, for example, 192 hours (8 days), creating a problem that a ball efficiency (material treating amount/ball weight), that is, the grind efficiency is poor.

In the producing method set forth in the above mentioned JP-B-6-80613, a sintering temperature is not clear. In the only example stating a temperature and containing 10 wt % $Bi_2O_3$, when the sintering temperature is 950° C., the density is around 4.86, and when ds (density) is 5 or higher, the sintering temperature is 960° C. or higher. Thus, the simultaneous sintering with Ag is difficult.

In view of the above mentioned problems involved with the prior arts, it is accordingly an object of the invention to provide oxide magnetic materials enabling to simultaneously sinter with Ag as an internal conductor, holding the sintering property and the permeability, and enabling to shorten the grind time, coil components using such oxide magnetic materials as well as a method of producing said oxide magnetic materials and a method of producing said coil components.

SUMMARY OF THE INVENTION

For accomplishing the object, the invention is to offer the oxide magnetic materials of the under mentioned (1) to (9), coil components using these oxide magnetic materials, as well as the method of producing the oxide magnetic materials and the method of producing the coil components.

(1) An oxide magnetic material where $Fe_2O_3$, ZnO, NiO and CuO are main components, is characterized in that $Y_2O_3$, $ZrO_2$ and $Bi_2O_3$ are contained with respect to these main components, such that an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same.

(2) A coil component of bulk type is characterized in that a sintered substance of the oxide magnetic material as set forth (1) is used.

(3) A laminated coil component is characterized in that a sintered substance of the oxide magnetic material as set forth in (1) is used, and the sintered substance is formed with an electric conductive layer.

(4) The laminated coil components as set forth in (3), characterized in that the electric conductive layer is Ag or Ag.Pd alloy being a main component.

(5) A method of producing oxide magnetic materials wherein $Fe_2O_3$, ZnO, NiO and CuO are main components, is characterized by employing a media agitating mill of wet internal circulation type when grind materials having passed through mixture and grind of raw materials and pre-sintering, using partially stabilized zirconia beads as media beads, and containing $Y_2O_3$ whose amount for the total amount is 0.007 to 0.028 wt % and $ZrO_2$ whose amount therefor is 0.12 to 0.55 wt %.

(6) A method of producing oxide magnetic materials for coil components wherein $Fe_2O_3$, ZnO, NiO and CuO are main components, is characterized by employing a media agitating mill of wet internal circulation type for grind materials having passed through mixture and grind of raw materials and pre-sintering, using partially stabilized zirconia beads as media beads, and containing $Y_2O_3$ whose amount for the total amount is 0.007 to 0.028 wt % and $ZrO_2$ whose amount therefor is 0.12 to 0.55 wt %, separately adding $Bi_2O_3$ to be 0.03 to 10.12 wt % for the total amount in the oxide magnetic material, and carrying out dispersion by means of the media agitating mill of wet internal circulation type.

(7) A method of producing oxide magnetic materials or oxide magnetic material for coil components as set forth in (5) or (6) is characterized by specifying agitation speed of the media beads to be 4.0 to 10.0 m/s.

(8) A method of producing laminated coil components is characterized by forming and sintering at 880 to 910° C. internal conductors in oxide magnetic materials, in which $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same.

(9) A method of producing laminated coil components as set forth in (8) is characterized in that the internal conductors are Ag or Ag.Pd alloy being a main component.

The under mentioned effects can be performed thereby.

(1) By using the oxide magnetic material in which $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same, it is possible to offer the oxide magnetic material, the density of which is 5 or higher, the sintering temperature is at the melting points of Ag or Ag.Pd or lower.

(2) As the coil component of bulk type is composed by using the sintered substance of the oxide magnetic material of the above (1), the bulk typed coil component can be composed of a sintered substance, the sintering temperature of which is at the melting points of Ag or Ag.Pd or lower, and the density is 5 or less.

(3) As the laminated coil component is composed by using the sintered substance of the oxide magnetic material of the above (1), it is possible to offer the laminated coil component of the sintered substance to be sintered the low temperature and the high density.

(4) As the internal conductor has the main component of Ag or Ag.Pd, the internal conductor can be composed of a substance of low resistance, and the laminated coil component of high quality factor or coefficient Q can be offered.

(5) As $Fe_2O_3$, ZnO, NiO and CuO are main components, containing $Y_2O_3$ whose amount for the total amount is 0.007 to 0.028 wt % and $ZrO_2$ whose amount therefor is 0.12 to 0.55 wt %, it is possible to employ the media agitating mill of the wet internal circulation type when grinding the materials having passed through the mixture and the grind of raw materials and pre-sintering, and use partially stabilized zirconia beads as media beads, thereby enabling to solve the difficult problem of managing the composition by much adding Fe as using conventional stainless steel beads.

(6) As the media agitating mill of the wet internal circulation type is employed and the partially stabilized zirconia beads are used as the media beads and $Bi_2O_3$ to be 0.03 to 10.12 wt % for the total amount of the main components is added and dispersed when grinding the materials having passed through mixture and grind of the raw materials and the pre-sintering, it is possible to produce the oxide magnetic materials for coil components of the high density in a short time of grind though the sintering is carried out at the low temperature.

(7) In the method of producing the oxide magnetic materials or the oxide magnetic material for coil components in the above (5) or (6), the agitation speed of the media beads is specified to be 4.0 to 10.0 m/s, thereby enabling to shorten the grind time to reduce the production cost and enabling the sinter at the melting point of Ag or lower.

(8) The internal conductor is formed in the oxide magnetic material in which $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same, and sintered at 880 to 910° C., thereby enabling to prevent shortage in sintering or diffusion of electrode materials into the ferrite, and enabling to produce products of less deviation of electric characteristics.

(9) In the method of producing the laminated coil components in (8), the internal conductor is Ag or Ag.Pd alloy being a main component, thereby enabling to produce the laminated coil component of high Q where the internal conductor is composed of a substance having low resistance.

DETAILED DESCRIPTION OF THE PREFERRED EMBODIMENTS

Figure 1:
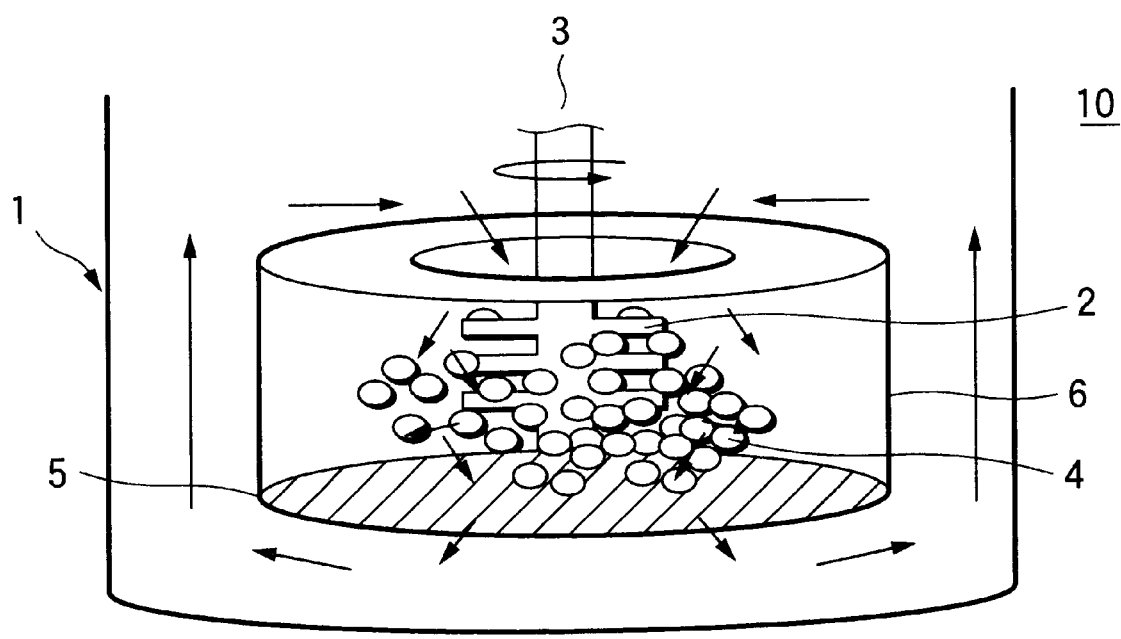
FIG. 1 is an explanatory view of the media agitating mill of the wet internal circulation type.

One example of the invention will be explained.

The oxide magnetic material of the invention contains $Fe_2O_3$, ZnO, NiO and CuO as the main components, and contains $Y_2O_3$, $ZrO_2$ and $Bi_2O_3$ with respect to the main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same.

So far as affecting no influences to the characteristics such as the permeability or the sintered density, P, Al, B, Mn, Mg, Co, Ba, Sr, Pb, W, V or Mo may be included as impurities. The composition of the main components is preferably $Fe_2O_3$ being 35 to 51 mol %, ZnO being 35 mol % or less (including 0), CuO 1 to 35 mol % and NiO 5 mol % or more.

Herein, if $Fe_2O_3$ is less than 35 mol %, the deterioration will appear in an initial permeability and the sintered density. In the sintering in an air, the deterioration starts in the initial permeability and the sintered density by precipitation of $Fe_3O_4$ from a range where $Fe_2O_3$ exceeds a stoichiometric composition. The remarkable precipitation is seen in a range where $Fe_2O_3$ exceeds 51 mol %, though depending on an analyzing machine.

The initial permeability may be properly determined depending on a frequency to be used, and a largest element for assuming the initial permeability is the ZnO amount. If a desired initial permeability is low, the ZnO amount is made 0, and if an initial permeability higher than it is desired, the ZnO amount should be increased. Exceeding 35 mol %, a Curie point goes down, and this value is a practical limit.

If CuO is less than 1 mol %, the sintering property decreases, while exceeding 35 mol %, a specific resistance of a core decreases.

If NiO is less than 5 mol %, the resistance of the core goes down, and when making a coil, Q also goes down. NiO of the rest of each component being 5 to 50 mol % is used.

When, for example, the powder after the pre-sintering is ground using PSZ balls containing $Y_2O_3$, it has been known that the PSZ balls containing $Y_2O_3$ about 3 mol % has the most excellent values of hardness and fracture toughness (refer to page 68 of "Tough zirconia—Tough ceramics" by HORI, Saburo issued by Kabushiki Kaisha Uchida Rhokakuho Nov. 30, 1990), and if obtaining powders ground with the PSZ balls, having average diameter being around 0.1 to 1.0 μm, when making, in this grind step, a composition of $Y_2O_3$ less than 0.007 wt % and $ZrO_2$ less than 0.12 wt % contained in the oxide magnetic material, the agitation speed should be delayed and the grind be carried out taking a long time.

But if the amounts of $Y_2O_3$ and $ZrO_2$ may be more than the above wt %, the grind efficiency is heightened and the grind is possible in a shorter time, though depending on the agitating speed.

If $Bi_2O_3$ is less than 0.03 wt % in a range where $Y_2O_3$ is more than 0.007 wt % and $ZrO_2$ is more than 0.12 wt %, it is difficult to obtain an apparent density of exceeding 5.0 g/cm³ where it is said that no problem occur in physical strength at 880° C. at which the simultaneous sintering of Ag and the oxide magnetic material is possible, and for securing the apparent density higher than this value, the sintering temperature of the oxide magnetic material cannot but be heightened.

The oxide magnetic material for coil components such as bulk typed coil components or the laminated coil components according to the invention is the ferrite material of $Fe_2O_3$, ZnO, NiO and CuO being the main components, and as needed, additives of small amounts such as P, Al, B, Mn, Mg, Co, Ba, Sr, Pb, W, V and Mo are weighed, otherwise contained as impurities, and as sub-components, $Y_2O_3$ and $ZrO_2$ mixed by abrasion of the PSZ balls as the media beads are contained using the media agitating mill of the wet internal circulation type when mixing and grinding the raw materials of said $Fe_2O_3$, ZnO, NiO and CuO, and grind after pre-sintering, and further, $Bi_2O_3$ is added when mixing and grinding the raw materials, and grinding after pre-sintering, and dispersed to contain by the media agitating mill of the wet internal circulation type.

The amount of containing $Y_2O_3$ is 0.007 to 0.028 wt % and the amount of containing $ZrO_2$ is 0.12 to 0.55 wt %, and if adjusting the grind time and the agitating speed of the media agitating mill of the wet internal circulation type when grinding the material after the pre-sintering, the amount of mixture from the media beads is adjusted, and if adjusting the amount of adding $Bi_2O_3$ to be 0.03 to 10.12 wt %, the sintering temperature is not necessary to be heightened and the sintering below the Ag melting point is possible, in spite of the mixture of $Y_2O_3$ and $ZrO_2$.

The core for the bulk typed coil is produced by adding binders to the oxide magnetic material manufactured as mentioned above and making granulation, molding to process into a desired shape, sintering in the air at 900° C. or higher, and winding a wire made of Au, Ag, Cu, Fe, Pt, Sn, Ni, Pb, Al, and Co or their alloys. The core may be processed after sintering.

On the other hand, the laminated coil is produced by laminating a paste for magnetic substance and a paste for internal conductor made of the oxide magnetic material as mentioned above through a thick film technique such as a printing method or a doctor blade, unitizing into one body, printing a paste for external electrode on the sintered surface, and sintering it.

The paste for the internal conductor generally includes conductive elements and binder solvents. For materials of the conductive elements, Ag of low resistant value is used for lowering the dc resistance of the inductor, aiming at increasing of a quality coefficient Q. What is important herein is that the sintering condition and the sintering atmosphere may be appropriately determined in response to qualities of the magnetic substance and conductive elements. The sintering temperature is 850 to 940° C., more preferably 880 to 910° C. 880 to 910° C. is the range of the sintering temperature where the Ag resistance shows the smallest value when only Ag is used as the conductive material. 850° C. is the lower limit where the magnetic material can be sintered. There might be a case that the density could not be 5 or higher at 910° C. depending on materials, and then the sintering be done at 940° C. In such a case, Ag and Pd such as Pd alloys must be used to the internal conductor.

One example of the invention will be explained.

As the main component of Ni—Cu—Zn ferrite, the composition of NiO: 20.8 mol %, CuO: 15.0 mol %, ZnO: 15.0 mol % and $Fe_2O_3$: 49.2 mol % was weighed, the PSZ balls of 3 mm diameter were used as the media beads, mixed by the media agitating mill of the wet internal circulation type, and pre-sintered at 800° C. after drying.

Subsequently, using the PSZ balls as the media beads, the pre-sintered substance was made 33% in the density by the media agitating mill of the wet internal circulation type, and finely ground as changing the agitation speed and the grind time as parameters.

As shown in FIG. 1, the media agitating mill 10 of the wet internal circulation type is for performing mixture, grind or grinding the sintered material by charging a water and a mixed and ground material or a sintered material to be a predetermined ratio in a vessel 1 and rotating an agitator arm 2 at high speed by an agitator shaft 3 in an agitating chamber 6. When grinding, a slurry is caused to flow in that the agitator arm 2 rotates at high speed in the agitating chamber 6. The invention carries out the mixture and the grind by shock of the media beads of the PSZ, and the only slurry passes through a mesh like media separator 5 at the lower part of the agitating chamber 6, turns out a convection and flows into the agitating chamber 6. The agitating chamber 6 has a slit at an upper part into which the slurry as the convection flows.

By repeating this flow, the mixture and grind or the grind of the sintered material are made possible. Arrow marks of FIG. 1 show the slurry flowing.

The agitating speed was demanded from the speed at a front end of the agitator arm 2, and was not that of the media beads 4 but the agitating speed of the media beads 4 may be assumed to approximate thereto, and the speed at the front end of the agitator was regarded as the agitating speed of the media beads.

TABLE 1A

| | | | Main impurities and mixing amount (wt %) | | | | | |
|---|---|---|---|---|---|---|---|---|
| | | C | D | E | F | G | H | I |
| | Sample 1 | A* | PSZ | 3 | 1 | 76 | 0.5 | 8 |
| | Sample 2 | A | PSZ | 3 | 2 | 67 | 0.5 | 8 |
| | Sample 3 | A | PSZ | 3 | 4 | 45 | 0.5 | 8 |
| | Sample 4 | A | PSZ | 3 | 4.3 | 38 | 0.5 | 8 |

TABLE 1A-continued

| | | | Main impurities and mixing amount (wt %) | | | | | |
|---|---|---|---|---|---|---|---|---|
| | | C | D | E | F | G | H | I |
| | Sample 5 | A | PSZ | 3 | 5 | 33 | 0.5 | 8 |
| | Sample 6 | A | PSZ | 3 | 6 | 23 | 0.5 | 8 |
| | Sample 7 | A | PSZ | 3 | 7 | 17 | 0.5 | 8 |
| | Sample 8 | A | PSZ | 3 | 8 | 10 | 0.5 | 8 |
| | Sample 9 | A | PSZ | 3 | 10 | 2 | 0.5 | 8 |
| | Sample 10 | A | PSZ | 3 | 4 | 45 | 0.5 | 8 |
| | Sample 11 | A | PSZ | 3 | 4.3 | 38 | 0.5 | 8 |
| | Sample 12 | A | PSZ | 3 | 5 | 33 | 0.5 | 8 |
| | Sample 13 | A | PSZ | 3 | 6 | 23 | 0.5 | 8 |
| | Sample 14 | A | PSZ | 3 | 7 | 17 | 0.5 | 8 |
| | Sample 15 | A | PSZ | 3 | 8 | 10 | 0.5 | 8 |
| | Sample 16 | A | PSZ | 3 | 10 | 2 | 0.5 | 8 |
| | Sample 17 | A | Stainless steel | 3 | 5 | 18 | 0.5 | 8 |
| J | Sample 18 | A | Titania | 3 | 5 | 33 | 0.5 | 8 |
| | Sample 19 | B | Stainless steel | 3 | | 192 | 0.5 | 8 |

A*: Media agitating mill of wet internal circulation system
B: Ball mill
C: Grinder
D: Ball material
E: Ball diameter mm
F: Agitating time m/s
G: Grinding time hr
H: Average grain diameter μm
I: Specific surface area m²/g
J: Prior examples

TABLE 1B

| | | Main impurities and mixing amount (wt %) | | | | | | | |
|---|---|---|---|---|---|---|---|---|---|
| | | $ZrO_2$ | $Y_2O_3$ | $Fe_2O_3$ | $TiO_2$ | $Al_2O_3$ | $SiO_2$ | $MoO_2$ | $Bi_2O_3$ |
| | Sample 1 | 0.01 | 0.001 | — | — | — | — | — | — |
| | Sample 2 | 0.060 | 0.003 | — | — | — | — | — | — |
| | Sample 3 | 0.120 | 0.007 | — | — | — | — | — | — |
| | Sample 4 | 0.150 | 0.008 | — | — | — | — | — | — |
| | Sample 5 | 0.170 | 0.011 | — | — | — | — | — | — |
| | Sample 6 | 0.220 | 0.012 | — | — | — | — | — | — |
| | Sample 7 | 0.310 | 0.016 | — | — | — | — | — | — |
| | Sample 8 | 0.370 | 0.021 | — | — | — | — | — | — |
| | Sample 9 | 0.600 | 0.031 | — | — | — | — | — | — |
| | Sample 10 | 0.120 | 0.007 | — | — | — | — | — | 0.03 |
| | Sample 11 | 0.150 | 0.008 | — | — | — | — | — | 0.05 |
| | Sample 12 | 0.170 | 0.011 | — | — | — | — | — | 0.11 |
| | Sample 13 | 0.220 | 0.012 | — | — | — | — | — | 1.05 |
| | Sample 14 | 0.300 | 0.016 | — | — | — | — | — | 2.98 |
| | Sample 15 | 0.370 | 0.021 | — | — | — | — | — | 4.98 |
| | Sample 16 | 0.600 | 0.031 | — | — | — | — | — | 10.12 |
| | Sample 17 | — | — | 8.12 | — | — | 0.013 | 0.002 | — |
| J | Sample 18 | — | — | — | 0.75 | 0.19 | 0.067 | 0.003 | — |
| | Sample 19 | — | — | 8.70 | — | — | 0.02 | 0.004 | — |

J: Prior examples

That is, in Table 1, with respect to Samples 1 to 9, the diameters of the used media beads were 3 mm, and in order that average diameters of materials would be 0.5 μm, i.e., specific surface area would be 8 m²/g, the agitating speeds were varied as 1.0 m/s, 2.0 m/s, 4.0 m/s, 4.3 m/s, 5.0 m/s, 6.0 m/s, 7.0 m/s, 8.0 m/s and 10.0 m/s, and in response to the respective agitating speeds, the grind times were varied as 76 hr, 67 hr, 45 hr, 38 hr, 33 hr, 23 hr, 17 hr, 10 hr and 2 hr. They were Samples 1 to 9, each of which was 0.5 μm in the average diameter, i.e., 8 m²/g in the specific surface area.

With respect to Samples 10 to 16, similarly to Samples 1 to 9, the diameters of the media beads were 3 mm, and in order that average diameters of materials would be 0.5 μm, i.e., specific surface area would be 8 m²/g, the agitating speeds were varied as 4.0 m/s, 4.3 m/s, 5.0 m/s, 6.0 m/s, 7.0 m/s, 8.0 m/s and 10.0 m/s, and in response to the respective agitating speeds, the grind times were varied as 45 hr, 38 hr, 33 hr, 23 hr, 17 hr, 10 hr and 2 hr. $Bi_2O_3$ of the amounts shown in Table 1 was added when mixing and grinding the raw materials, i.e., at the beginning.

For comparison, tests were practiced to Samples 17 to 19 as conventional examples.

In Sample 17, main components were NiO of 22.0 mol %, CuO of 15.0 mol %, ZnO of 17.0 mol %, and $Fe_2O_3$ of 46.0 mol %. The grind machine was the media agitating mill of the wet internal circulation type, in which balls were 3 mm in diameter and materials were stainless steel, and the agitating speed and the grind time were set for obtaining the average diameter of 0.5 μm in, i.e., the specific surface area 8 $m^2/g$ as Samples 1 to 16.

In Sample 18, main components were those of Samples 1 to 16. The grind machine was the media agitating mill of the wet internal circulation type, in which balls were 3 mm in diameter and materials were titania, and the agitating speed and the grind time were set for obtaining the average diameter of 0.5 μm in, i.e., the specific surface area 8 $m^2/g$ as Samples 1 to 9.

In Sample 19, main components were NiO of 22.0 mol %, CuO of 15.0 mol %, ZnO of 17.0 mol %, and $Fe_2O_3$ of 46.0 mol %. The grind machine was the ball mill, in which balls were 3 mm in diameter and materials were stainless steel, and the average diameter of 0.5 μm in, i.e., the specific surface area 8 $m^2/g$ were obtained.

Impurities in the materials shown in Table 1 and the mixing amounts as well as quantitative analyses of main components after production were measured by a fluorescent X-ray analysis method. The specific surface areas were measured through BET One point method with a fluid typed specific surface area automatic measuring apparatus flow soab made by SHIMDZU. The average diameters were measured through the laser analysis—diffusion method with the micro truck HRA9320-X100 Type made HONEWELL Inc.

Preparation of Materials for Measuring Permeability and Sintered Density

The materials shown in Samples 1 to 19 were added as a binder with a water solution of PVA124: 0.3% and granulated, molded into desired shapes under later mentioned conditions, and sintered for two hours at 870° C., 890° C., 910° C., and 940° C. in the air.

Evaluation

The evaluations as materials for cores were performed by the grind time until desired specific surface ratios, confirmation of impurities which were taken as inclusions by abrasion of the media beads, deviation in the composition of $Fe_2O_3$, ZnO, CuO and NiO as the main components shown in Table 2, the initial permeability shown in Table 3 and the apparent density shown in Table 4.

TABLE 2

Weighed values and change of composition after production

| | $Fe_2O_3$ | ZnO | NiO | CuO | $Fe_2O_3$ | ZnO | NiO | CuO |
|---|---|---|---|---|---|---|---|---|
| Sample 1 | 49.2 | 15.0 | 20.8 | 15.0 | 49.1 | 15.02 | 20.88 | 14.99 |
| Sample 2 | 49.2 | 15.0 | 20.8 | 15.0 | 49.2 | 15.03 | 20.87 | 14.95 |
| Sample 3 | 49.2 | 15.0 | 20.8 | 15.0 | 49.1 | 15.05 | 20.87 | 14.96 |
| Sample 4 | 49.2 | 15.0 | 20.8 | 15.0 | 49.2 | 15.02 | 20.87 | 14.96 |
| Sample 5 | 49.2 | 15.0 | 20.8 | 15.0 | 49.2 | 15.01 | 20.88 | 14.95 |
| Sample 6 | 49.2 | 15.0 | 20.8 | 15.0 | 49.2 | 15.06 | 20.83 | 14.96 |
| Sample 7 | 49.2 | 15.0 | 20.8 | 15.0 | 49.2 | 15.03 | 20.84 | 14.97 |
| Sample 8 | 49.2 | 15.0 | 20.8 | 15.0 | 49.1 | 15.04 | 20.92 | 14.92 |
| Sample 9 | 49.2 | 15.0 | 20.8 | 15.0 | 49.2 | 15.03 | 20.87 | 14.95 |
| Sample 10 | 49.2 | 15.0 | 20.8 | 15.0 | 49.1 | 15.02 | 20.91 | 14.96 |
| Sample 11 | 49.2 | 15.0 | 20.8 | 15.0 | 49.2 | 15.06 | 20.81 | 14.97 |
| Sample 12 | 49.2 | 15.0 | 20.8 | 15.0 | 49.2 | 15.02 | 20.82 | 14.98 |
| Sample 13 | 49.2 | 15.0 | 20.8 | 15.0 | 49.1 | 15.04 | 20.91 | 14.93 |
| Sample 14 | 49.2 | 15.0 | 20.8 | 15.0 | 49.1 | 15.04 | 20.90 | 14.95 |
| Sample 15 | 49.2 | 15.0 | 20.8 | 15.0 | 49.2 | 15.03 | 20.86 | 14.95 |
| Sample 16 | 49.2 | 15.0 | 20.8 | 15.0 | 49.2 | 15.02 | 20.85 | 14.97 |
| Sample 17 | 46.0 | 17.0 | 22.0 | 15.0 | 49.0 | 14.17 | 20.78 | 16.05 |
| Sample 18 | 49.2 | 15.0 | 20.8 | 15.0 | 49.2 | 15.02 | 20.83 | 14.92 |
| Sample 19 | 46.0 | 17.0 | 22.0 | 15.0 | 49.2 | 14.11 | 20.70 | 15.99 |
| | Weighed values | | | | (mol %) Composition after production | | | |

TABLE 3

Measured results of initial permeability

| | 870° C. Sintering | 880° C. Sintering | 890° C. Sintering | 910° C. Sintering | 940° C. Sintering |
|---|---|---|---|---|---|
| Sample 1 | 66 | 83 | 112 | 144 | 151 |
| Sample 2 | 69 | 84 | 114 | 145 | 152 |
| Sample 3 | 68 | 83 | 112 | 140 | 152 |
| Sample 4 | 66 | 80 | 108 | 140 | 149 |
| Sample 5 | 66 | 80 | 104 | 132 | 147 |
| Sample 6 | 63 | 77 | 97 | 119 | 137 |
| Sample 7 | 53 | 63 | 80 | 102 | 116 |
| Sample 8 | 38 | 49 | 72 | 90 | 105 |
| Sample 9 | 28 | 32 | 40 | 46 | 51 |
| Sample 10 | 64 | 79 | 100 | 119 | 135 |
| Sample 11 | 65 | 85 | 108 | 120 | 130 |
| Sample 12 | 66 | 91 | 116 | 119 | 123 |
| Sample 13 | 83 | 98 | 112 | 113 | 115 |
| Sample 14 | 70 | 80 | 88 | 90 | 92 |
| Sample 15 | 69 | 72 | 74 | 74 | 73 |
| Sample 16 | 35 | 45 | 50 | 51 | 52 |
| Sample 17 | 64 | 77 | 103 | 130 | 146 |
| Sample 18 | 18 | 20 | 23 | 63 | 72 |
| Sample 19 | 66 | 74 | 104 | 132 | 145 |

TABLE 4

Measured results of sintered density

| | 870° C. Sintering | 880° C. Sintering | 890° C. Sintering | 910° C. Sintering | 940° C. Sintering |
|---|---|---|---|---|---|
| Sample 1 | 4.71 | 5.00 | 5.10 | 5.19 | 5.24 |
| Sample 2 | 4.73 | 5.00 | 5.10 | 5.23 | 5.23 |
| Sample 3 | 4.72 | 4.96 | 5.08 | 5.22 | 5.24 |
| Sample 4 | 4.69 | 4.96 | 5.07 | 5.20 | 5.23 |
| Sample 5 | 4.68 | 4.93 | 5.05 | 5.18 | 5.24 |
| Sample 6 | 4.65 | 4.85 | 5.02 | 5.14 | 5.23 |
| Sample 7 | 4.62 | 4.83 | 4.97 | 5.09 | 5.18 |
| Sample 8 | 4.61 | 4.83 | 4.95 | 5.07 | 5.15 |
| Sample 9 | 4.19 | 4.26 | 4.37 | 4.46 | 4.57 |
| Sample 10 | 4.75 | 5.00 | 5.10 | 5.25 | 5.30 |
| Sample 11 | 4.85 | 5.05 | 5.15 | 5.23 | 5.32 |
| Sample 12 | 49.99 | 5.10 | 5.20 | 5.24 | 5.32 |
| Sample 13 | 5.14 | 5.14 | 5.25 | 5.25 | 5.32 |
| Sample 14 | 5.20 | 5.21 | 5.27 | 5.29 | 5.33 |
| Sample 15 | 5.14 | 5.22 | 5.30 | 5.29 | 5.35 |

TABLE 4-continued

Measured results of sintered density

| | 870° C. Sintering | 880° C. Sintering | 890° C. Sintering | 910° C. Sintering | 940° C. Sintering |
|---|---|---|---|---|---|
| Sample 16 | 5.13 | 5.26 | 5.35 | 5.36 | 5.35 |
| Sample 17 | 4.65 | 4.93 | 5.03 | 5.17 | 5.24 |
| Sample 18 | 3.71 | 3.94 | 4.00 | 4.26 | 4.53 |
| Sample 19 | 4.66 | 4.94 | 5.04 | 5.18 | 5.25 (g/cm$^3$) |

The initial permeability was measured by the steps of molding into toroidal shapes of 18 mm outer diameter×10 mm inner diameter×1 mm height, sintering at desired temperatures in the air, winding a wire 20 times to actually produce coils, exerting a magnetic field 0.4 A/m by an impedance analyzer (4291A made by Hewlett Packard Inc.), measuring inductance of 100 KHz, and calculating constants obtained from the shapes.

The apparent density was obtained by demanding a volume from the dimension of the sintered material and dividing the mass with the volume. The apparent density is for seeing "good" or "bad" of the sintered degree. If the apparent density is low, it is possible to judge much vacancies are within the sintered substance. If making the elements of materials having the low apparent density, problems will occur that a reliability is affected with influences as a short badness by such vacancies, or physical strength is made brittle. The apparent density to a degree of generating the problems is in general 5.0 g/cm$^3$ which is 95% or higher of the theoretical density of Ni—Cu—Zn ferrite (5.3 to 5.5 g/cm$^3$).

Evaluated Results

[Mixture of impurities]

In Table 1, as shown in Samples 1 to 16, when the desired specific surface area is 8 m$^2$/g, since the grind time is short as the agitating speed increases, it is seen that heightening of the agitating speed improves the grind efficiency. The heightening of the agitating speed increases abrasion amount of media beads. When PSZ was used as the media beads, $ZrO_2$ and $Y_2O_3$ as the main components were mixed but any mixture of other components was not recognized.

On the other hand, in Samples 17 and 18 of the existing examples, comparing with the grind time and the ball abrasion amount of Sample 5 having the same grind speed, when Sample 17, that is, the stainless steel is used as the media beads, the grind time is shortened and the grind efficiency is very heightened than Sample 5. With respect to the abrasion amount, in comparison with ($ZrO_2+Y_2O_3$=0.170+0.011=0.181 wt %) of Sample 5, Sample 17 is ($Fe_2O_3+SiO_2+MoO_3$=8.12+0.013+0.002=8.135 wt %). This ratio is about 45 times. Sample 17 is very much. When Sample 18, that is, titania is used as the media beads, the abrasion amount is about 6 times in comparison with Sample 5.

[Deviation of composition of material by mixture of impurities]

Table 2 shows deviations of the compositions of the materials having passed through the mixture, grind, sintering and fine grind from the weighing of $Fe_2O_3$, ZnO, CuO and NiO being the main components. Those are results of the quantitative analyses of the respective oxides being the main components. As apparently from Table 2, as Samples 17 and 19, when the stainless steel is used as the media beads, the deviation of $Fe_2O_3$ is large from the weighing to the completion of production, and the composition of $Fe_2O_3$ required to be most carefully managed in Ni—Cu—Zn ferrite increases more than 3 mol %.

The stainless steel has the difference in hardness in the internal part and the external part, and if the media beads are used for long period of time, since difference appears in the mixing amount of $Fe_2O_3$, it is difficult to manage the composition.

[Initial permeability and apparent density]

The initial permeability shown in Table 3 can be properly altered by the composition in response to frequency to be used. It is seen that Samples 1 to 9 of the same composition are closely relative with the apparent density shown in Table 4. That is, in Sample 9 where an only relatively low permeability is obtained, the apparent density also goes down.

In Samples 1 to 9, the media agitating mill of the wet internal circulation type was used, and the agitating speed was changed such that the specific surface area is 8 m$^2$/g, but it is seen that the characteristic is deteriorated by heightening the agitating speed together with the permeability and the sintered density. Because the increase of the amount of $ZrO_2$ and $Y_2O_3$ being the components of PSZ contributes to the deterioration of the characteristic.

In Samples 10 to 16, if containing $Bi_2O_3$ of the desired amount, almost equivalent permeability is obtained and it is possible to obtain the high apparent density. If comparisons are made to Samples 3 and 10, Samples 4 and 11, Samples 5 and 12, Samples 6 and 13, Samples 7 and 14, Samples 8 and 15, Samples 9 and 16, which were produced under the equivalent conditions and different only in presence and absence of $Bi_2O_3$, the sintered materials of high density are obtained at the sintering temperature of 880° C. in the vicinity of the theoretical density.

Further, if comparing Sample 6 and Sample 13, it is seen that although the characteristic is deteriorated at the agitating speed of 6 m/s with the amount of mixing $ZrO_2$ being 0.22 wt % and $Y_2O_3$ being 0.012 wt %, good characteristic is obtained by adding $Bi_2O_3$ of the desired amount. Also it is seen that the sintering at 880° C., that is, below the Ag melting point is available.

[Amount of $Bi_2O_3$ and agitating speed]

Samples where the apparent density of 5.0 g/cm$^3$ or higher is obtained by sintering at 880° C. or lower suited to the simultaneous sintering with Ag, are as apparently from Table 4, Sample 1, Sample 2, Samples 10 to 16, Sample 17 and Sample 19.

As to Samples 3 to 9, $Bi_2O_3$ is not contained, and the agitating speed is 4 to 10 m/s. In this case, although the average diameter and the specific surface area are the same as those of Samples 1 and 2, and since $ZrO_2$ and $Y_2O_3$ are too much than those of them, the apparent density of 5.0 g/cm$^3$ or higher cannot be obtained in spite of the sintering temperature of 880° C.

In Samples 1 and 2, the agitating speeds are 1 m/s and 2 m/s, respectively and until the specific surface becomes 8.0 m$^2$/g, long times as 76 hours and 67 hours are taken, so that a lead time for production is undesirably long.

As Samples 10 to 16, if $Bi_2O_3$ of 0.03 wt % is contained for the agitating speed of 4 m/s, $Bi_2O_3$ of 0.05 wt % is contained for the agitating speed of 4.3 m/s, $Bi_2O_3$ of 0.11 wt % is contained for the agitating speed of 5 m/s, $Bi_2O_3$ of 1.05 wt % is contained for the agitating speed of 6 m/s, $Bi_2O_3$ of 2.98 wt % is contained for the agitating speed of 7 m/s, $Bi_2O_3$ of 4.98 wt % is contained for the agitating speed of 8 m/s, and $Bi_2O_3$ of 10.12 wt % is contained for the agitating speed of 10 m/s, the lead time for production is shortened, and besides as $Fe_2O_3$ is not mixed the management of the composition is easy. By the sintering at 880° C. enabling the simultaneous sintering with Ag, the apparent density of exceeding 5.0 g/cm$^3$. $Bi_2O_3$ suited to the above containing is 0.3 to 10.12 wt %.

[Sintering temperature]

Being 960° C. of the Ag melting point or lower, the simultaneous sintering with Ag is possible. Accordingly, the sintering temperature is preferably 800 to 950° C., more preferably 880 to 910° C. In a case of Sample 18 using titania ball, if the sintering temperature is 940° C. or lower, the sintered density of 5.0 g/cm$^3$ cannot be obtained.

In the method disclosed in the above mentioned Japanese Patent No. 2708160, as the mixing amount of impurities by abrasion of the media beads is controlled to be around 0.02 wt %, the grind is slow taking a long time as 192 hours (8 days). In contrast, in the invention, aiming at the simultaneous sintering of the oxide magnetic material and Ag, $Bi_2O_3$ is contained, and even in the sintering at around 880° C., $ZrO_2$ and $Y_2O_3$ may be contained up to 0.55 wt % and 0.028 wt %, for example, as Sample 16, in the range where the apparent density of 5.0 g/cm$^3$ or higher.

The following effects can be displayed by the invention.

(1) By using the oxide magnetic material in which $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same, it is possible to offer the oxide magnetic material, the density of which is 5 or higher, the sintering temperature is at the melting points of Ag or Ag.Pd or lower, and demands may be replied in the phase of the permeability.

(2) As the coil component of bulk type is composed by using the sintered substance of the oxide magnetic material of the above (1), the bulk typed coil component can be composed of a sintered substance, the sintering temperature of which is at the melting points of Ag or Ag.Pd or lower, and the density is 5 or less.

(3) As the laminated coil component is composed by using the sintered substance of the oxide magnetic material of the above (1), it is possible to offer the laminated coil component of the sintered substance to be sintered the low temperature and the high density and no less than those sintered at high temperature in the phase of the permeability.

(4) As the internal conductor has the main component of Ag or Ag.Pd, the internal conductor can be composed of a substance of low resistance, and the laminated coil component of high Q can be offered.

(5) As $Fe_2O_3$, ZnO, NiO and CuO are main components, containing $Y_2O_3$ whose amount for the total amount is 0.007 to 0.028 wt % and $ZrO_2$ whose amount therefor is 0.12 to 0.55 wt %, it is possible to employ the media agitating mill of the wet internal circulation type when grinding the materials having passed through the mixture and the grinding of raw materials and pre-sintering, and use partially stabilized zirconia beads as media beads, thereby enabling to solve the difficult problem of managing the composition by much adding Fe as using conventional stainless steel beads.

(6) As the media agitating mill of the wet internal circulation type is employed and the partially stabilized zirconia beads are used as the media beads and $Bi_2O_3$ to be 0.03 to 10.12 wt % for the total amount of the main components is added and dispersed when grinding the materials having passed through mixture and grinding of the raw materials and the pre-sintering, it is possible to produce the oxide magnetic materials for coil components of the high density in a short time of grind though the sintering is carried out at the low temperature.

(7) In the method of producing the oxide magnetic materials or the oxide magnetic material for coil components in the above (5) or (6), the agitation speed of the media beads is specified to be 4.0 to 10.0 m/s, thereby enabling to shorten the grind time to reduce the production cost and enabling the sintering at the melting point of Ag or lower.

(8) The internal conductor is formed in the oxide magnetic material in which $Fe_2O_3$, ZnO, NiO and CuO are main components, and $Y_2O_3$, $ZrO_2$ and $Bi_2O_3$ are contained with respect to these main components, where an amount of $Y_2O_3$ is 0.007 to 0.028 wt % for the total amount, an amount of $ZrO_2$ is 0.12 to 0.55 wt % therefor and an amount of $Bi_2O_3$ is 0.03 to 10.12 wt % for the same, and sintered at 880 to 910° C., thereby enabling to prevent shortage in sintering or diffusion of electrode materials into the ferrite, and enabling to produce products of less deviation of electric characteristics.

(9) In the method of producing the laminated coil components in (8), the internal conductor is Ag or Ag.Pd alloy being a main component, thereby enabling to produce the laminated coil component of high Q where the internal conductor is composed of a substance having low resistance.

What is claimed is:

1. An oxide magnetic material comprising:
   $Fe_2O_3$ of 35 to 51 mol %, ZnO less than 35 mol %, NiO more than 5 mol % and CuO of 1 to 35 mol % as main components, and
   $Y_2O_3$, $ZrO_2$ and $Bi_2O_3$ are contained with respect to these main components, where an amount of $Y_2O_3$ is 0.007 to 0.028 wt %, an amount of $ZrO_2$ is 0.12 to 0.55 wt % and an amount of $Bi_2O_3$ is 0.03 to 10.12 wt % for the total amount.

2. Coil components of bulk type comprising:
   a sintered substance of an oxide magnetic material comprising: $Fe_2O_3$ of 35 to 51 mol %, ZnO less than 35 mol %, NiO more than 5 mol % and CuO of 1 to 35 mol % as main components, and $Y_2O_3$, $ZrO_2$ and $Bi_2O_3$ are contained with respect to these main components, where an amount of $Y_2O_3$ is 0.007 to 0.028 wt %, an amount of $ZrO_2$ is 0.12 to 0.55 wt % and an amount of $Bi_2O_3$ is 0.03 to 10.12 wt % for the total amount.

3. A laminated coil component comprising:
   a sintered substance of an oxide magnetic material comprising: $Fe_2O_3$ of 35 to 51 mol %, ZnO less than 35 mol %, NiO more than 5 mol % and CuO of 1 to 35 mol % as main components, and $Y_2O_3$, $ZrO_2$ and $Bi_2O_3$ are contained with respect to these main components, where an amount of $Y_2O_3$ is 0.007 to 0.028 wt %, an amount of $ZrO_2$ is 0.12 to 0.55 wt % and an amount of $Bi_2O_3$ is 0.03 to 10.12 wt % for the total amount;
   wherein said sintered substance is formed with an electric conductive layer.

4. A laminated coil component as set forth in claim 3, wherein the electric conductive layers are Ag or Ag.Pd alloy being a main component.

5. A method of producing an oxide magnetic material comprising $Fe_2O_3$ of 35 to 51 mol %, ZnO less than 35 mol %, NiO more than 5 mol % and CuO of 1 to 35 mol % as main components, the method comprising the steps of:
   employing a media agitating mill of wet internal circulation type when grinding materials having passed through mixture and grind of raw materials and pre-sintering, using partially stabilized zirconia beads as media beads;

containing $Y_2O_3$ whose amount is 0.007 to 0.028 wt % and $ZrO_2$ whose amount is 0.12 to 0.55 wt %; and separately adding $Bi_2O_3$ whose amount is 0.03 to 10.12 wt %.

6. A method of producing oxide magnetic materials for coil components, comprising $Fe_2O_3$ of 35 to 51 mol %, ZnO less than 35 mol %, NiO more than 5 mol % and CuO of 1 to 35 mol % as main components, the method comprising the steps of:

employing a media agitating mill of wet internal circulation type for grinding materials having passed through mixture and grind of raw materials and pre-sintering, using partially stabilized zirconia beads as media beads;

containing $Y_2O_3$ whose amount for the total amount is 0.007 to 0.028 wt % and $ZrO_2$ whose amount therefor is 0.12 to 0.55 wt %;

separately adding $Bi_2O_3$ to be 0.03 to 10.12 wt % for the total amount in the oxide magnetic material;

carrying out dispersion by means of the media agitating mill of wet internal circulation type.

7. A method of producing oxide magnetic material as set forth in claim 5 or 6, wherein agitation speed of the media beads is in a range of 4.0 to 10.0 m/s.

8. A method of producing laminated coil components characterized by forming and sintering at 880 to 910° C. internal conductors in an oxide magnetic material comprising: $Fe_2O_3$ of 35 to 51 mol %, ZnO less than 35 mol %, NiO more than 5 mol % and CuO of 1 to 35 mol % as main components, and $Y_2O_3$, $ZrO_2$ and $Bi_2O_3$ are contained with respect to these main components, where an amount of $Y_2O_3$ is 0.007 to 0.028 wt %, an amount of $ZrO_2$ is 0.12 to 0.55 wt % and an amount of $Bi_2O_3$ is 0.03 to 10.12 wt % for the total amount.

9. A method of producing laminated coil components as set forth in claim 8, wherein the internal conductors are Ag or Ag.Pd alloy being a main component.

* * * * *